(12) United States Patent
Nakamura et al.

(10) Patent No.: US 6,244,335 B1
(45) Date of Patent: Jun. 12, 2001

(54) VEHICULAR AIR-CONDITIONER

(75) Inventors: Takeshi Nakamura, Anjo; Tatsuo Tsunooka; Hiroshi Kanda, both of Kariya; Nobuyasu Naito, Iwakura, all of (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/251,525

(22) Filed: Feb. 17, 1999

(30) Foreign Application Priority Data

Feb. 19, 1998 (JP) .................................................. 10-037625

(51) Int. Cl.7 .................................................. F25B 29/00
(52) U.S. Cl. .............................. 165/203; 165/42; 165/43; 454/156; 454/121; 237/12.3 A; 237/12.3 B
(58) Field of Search ................................ 165/203, 42, 43; 454/156, 121; 237/12.3 A, 12.3 B

(56) References Cited

U.S. PATENT DOCUMENTS

| | | | |
|---|---|---|---|
| 5,042,566 | * 8/1991 | Hildebrand | 165/43 |
| 5,653,630 | * 8/1997 | Higashihara | 454/121 |
| 5,711,368 | * 1/1998 | Ito et al. | 165/43 |
| 5,775,407 | * 7/1998 | Inoue | 165/43 |
| 5,862,677 | * 1/1999 | Kim et al. | 165/42 |
| 5,934,989 | * 10/1999 | Yamamoto | 454/156 |

* cited by examiner

*Primary Examiner*—John K. Ford
(74) *Attorney, Agent, or Firm*—Harness, Dickey & Pierce, PLC

(57) ABSTRACT

A vehicular air-conditioner provided with a rear face duct and rear foot duct, wherein the dimensions of the vehicular air-conditioner in the lengthwise direction are reduced by arranging the rear face duct (26) and foot duct (31) to appear to overlap at the parts extending downward when viewed from the side. Specifically, the rear face duct (26) is bent to the vehicle front to fit in the space formed by splitting the foot duct 31 into two from an intermediate position of the downstream side to form the right side duct portion (31a) and the left side duct portion (31b).

2 Claims, 8 Drawing Sheets

VEHICULAR AIR-CONDITIONER

BACKGROUND OF THE INVENTION

1. Field of the Invention

The present invention relates to a vehicular air-conditioner, more particularly to the configuration of the ducts of a vehicular air-conditioner.

2. Description of the Related Art

Known in the art, as illustrated in FIG. 1 and FIG. 2, is a vehicular air-conditioner provided with an air-conditioning unit for mainly the front seats having both a rear face duct for blowing air-conditioned air toward the upper torsos of the rear seat passengers and a rear foot duct for blowing air-conditioned air toward the lower torsos of the rear seat passengers so as to enhance the feeling of the rear seat passengers of being air-conditioned. FIG. 1 is a schematic side view of one such vehicular air-conditioner of the related art, while FIG. 2 is a schematic rear view of FIG. 1 seen from the vehicle rear side to the vehicle front side.

Reference numeral 100 represents a front face opening portion which opens at an upper position of the air-conditioning unit and blows air-conditioned air toward the upper torsos of the front seat passengers. At the upstream side (based on the flow of air, same below) from the front face opening portion 100 is opened a rear face opening portion 102 for blowing air-conditioned air toward the upper torsos of the rear seat passengers. At the side of the rear face opening portion 102 is opened a foot opening portion 101, explained later. These two opening portions 101 and 102 have dampers 106 which enable air-conditioned air to be introduced selectively in either direction or in two directions simultaneously.

The front face opening portion 100 is provided with for example a rear face duct 103 made of plastic. Air-conditioned air is designed to be blown from the rear face duct 103 toward a rear face outlet (not shown) arranged at the rear seat side.

The fore-mentioned foot opening portion 101 is for blowing air-conditioned air toward the lower torsos of the passengers. The foot opening portion 101 is provided with a foot duct 104 extending downward. At the right side of the vehicle at a lower position of the foot duct 104 is formed a right side front foot opening portion 105a (serving also as one front foot outlet in the compartment) for blowing air-conditioned air toward the lower torso of the right side front seat passenger as shown in FIG. 2. On the other hand, at the left side of the vehicle at a lower position of the foot duct 104 is formed a left side front foot opening portion 105b (serving also as another front foot outlet in the compartment) for blowing air-conditioned air toward the lower torso of the left side front seat passenger as shown in FIG. 2 and FIG. 1.

Further, at the downstream side from the right side front foot opening portion 105a in the foot duct 104 is formed a right side rear foot opening portion 106a for blowing air-conditioned air toward the lower torso of the right side rear seat passenger. Further, at the downstream side from the left side front foot opening portion 105b in the foot duct 104 is formed a left side rear foot opening portion 106b for blowing air-conditioned air toward the lower torso of the left side rear seat passenger.

The right side rear foot opening portion 106a and the left side rear foot opening portion 106b have not been shown with rear foot ducts connected to them. Air-conditioned air is blown from these toward a right side rear foot outlet and a left side rear foot outlet arranged at the rear seat side.

Accordingly, the air-conditioned air flowing into the foot duct 104 is split among the right side front foot opening portion 105a, the left side front foot opening portion 105b, the right side rear foot opening portion 106a, and the left side rear foot opening portion 106b.

In the above air-conditioner of the related art, however, since as shown in FIG. 1 the foot duct 104 and the rear face duct 103 are arranged aligned completely independently in the lengthwise direction of the vehicle, there is the problem that the length of the air-conditioning unit in the lengthwise direction of the vehicle becomes large.

SUMMARY OF THE INVENTION

The present invention was designed to solve the above problem. An object of the present invention is to provide a vehicular air-conditioner provided with a mainly front seat side air-conditioning unit having a rear face duct for blowing air-conditioned air toward the upper torsos of the rear seat passengers and a rear foot duct for blowing air-conditioned air toward the lower torsos of the rear seat passengers, wherein the size of the vehicular air-conditioner is made smaller without reducing the area of the air passage.

The present invention adopts the following technical means to achieve the above object.

The vehicular air-conditioner set forth in claims 1 to 7 is characterized in that the foot duct (31) and the rear face duct (26) are arranged to overlap each other at least at parts when viewed from the side.

In this way, since the rear face duct (26) and the foot duct (31) are arranged so that parts of these extending downward overlap when viewed from the side, the size of the air-conditioning unit in the lengthwise direction of the vehicle becomes smaller than in the related art.

In particular, the vehicular air-conditioner as set forth in claim 2 is characterized in that the right side duct portion (31a) and the left side duct portion (31b) are arranged so that the portion of the foot duct (31) at the downstream side is aligned in the widthwise direction of the vehicle.

In the vehicular air-conditioner as set forth in claim 3, a front face inlet for blowing air-conditioned air toward the upper torsos of the front seat passengers is formed in the air-conditioning unit (10) at the upstream side from the rear inlet of the rear face duct (26). The front face inlet and the foot inlet (28) are switched to introduce and to block the inflow by a single damper member (29).

If the rear face duct (26) positioned at the upper side is arranged directly after the vehicle rear side of the foot inlet (28), the intermediate portion in the widthwise direction of the vehicle in the foot inlet (28) is blocked by the rear face duct (26), so two independent foot ducts (31) are formed. If part of the foot inlet (28) is blocked in this way, there is the problem that the amount of air introduced into the foot ducts (31) is reduced.

Therefore, in the vehicular air-conditioner as set forth in claim 4, since the right side duct portion (31a) and the left side duct portion (31b) are formed by splitting the foot duct (31) at the downstream side portion into two, it is possible to blow a sufficient amount of air to the foot duct without a reduction of the area of the opening of the foot inlet (28).

Further, in the vehicular air-conditioner as set forth in claim 4, note was taken of the fact that the right side duct portion and the left side duct portion were formed by splitting the foot duct into two from an intermediate position of the downstream side and of the space formed by the split, that is, the dead space. The rear face duct (26) is bent to the vehicle front to fit into the dead space. By doing this, the same type of effect is obtained as with the vehicular air-conditioner as set forth in claim 1.

Further, the vehicular air-conditioner as set forth in claim 5 is characterized in that the right side duct portion (31a) has a first duct portion (51a) heading toward the rear side of the vehicle at the downstream side of the flow path extending downward, the left side duct portion (31b) has a second duct portion (51b) heading toward the rear side of the vehicle at the downstream side of the flow path extending downward, the first duct portion (51a) and second duct portion (51b) are arranged aligned with a predetermined interval (a) between them in the widthwise direction of the vehicle, and the width (b), in the widthwise direction of the vehicle, of the flow path positioned in the rear face duct (26) at the vehicle rear side from the right side duct portion (31a) and left side duct portion (31b) becomes larger than the predetermined interval (a) at an upper position of the first duct portion (51a) and second duct portion (5b).

To reduce the size of the air-conditioning unit in the lengthwise direction of the vehicle, it may be considered to reduce the length of the rear face duct in the lengthwise direction of the vehicle. By doing this, the amount of air is reduced by the reduction of the sectional area of the flow path.

Therefore, in the vehicular air-conditioner as set forth in claim 6, the width, in the widthwise direction of the vehicle, of the flow path positioned in the rear face duct at the vehicle rear side from the right side duct portion and left side duct portion is made larger than the predetermined interval between the first and second ducts at an upper position of the first duct portion and second duct portion not interfering with the first duct portion and second duct portion, whereby the sectional area of the flow path does not have to be reduced.

Further, in the vehicular air-conditioner as set forth in claim 7, the foot duct and the rear face duct can be easily formed by assembling two air-conditioning cases in the vehicular air-conditioner set forth in claim 6.

Note that the reference numerals shown in parentheses attached to the means show the correspondence with specific means set forth in the embodiments explained later.

BRIEF DESCRIPTION OF THE DRAWINGS

These and other objects and advantages of the present invention will become clearer from the following embodiments explained in detail with reference to the accompanying drawings, wherein:

FIGS. 8A to 8C show parts of the vehicular air-conditioner shown in FIG. 7, wherein FIG. 8A is a perspective view, FIG. 8B is a plane view from above, and FIG. 8C is a side view.

DESCRIPTION OF THE PREFERRED EMBODIMENTS

Figure 1:
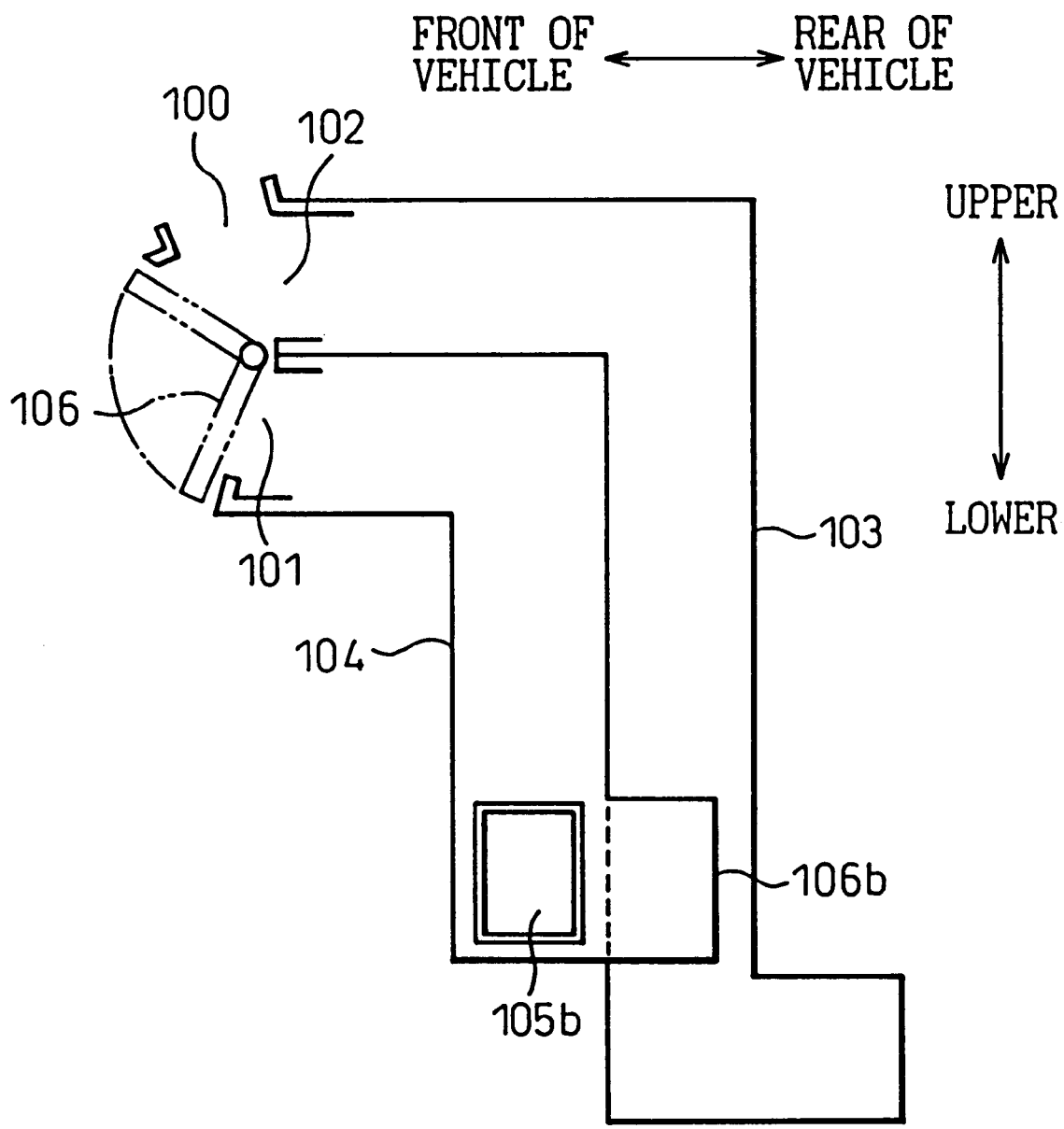
FIG. 1 is a schematic side view of the configuration of a foot duct and rear face duct of the related art.
Figure 2:
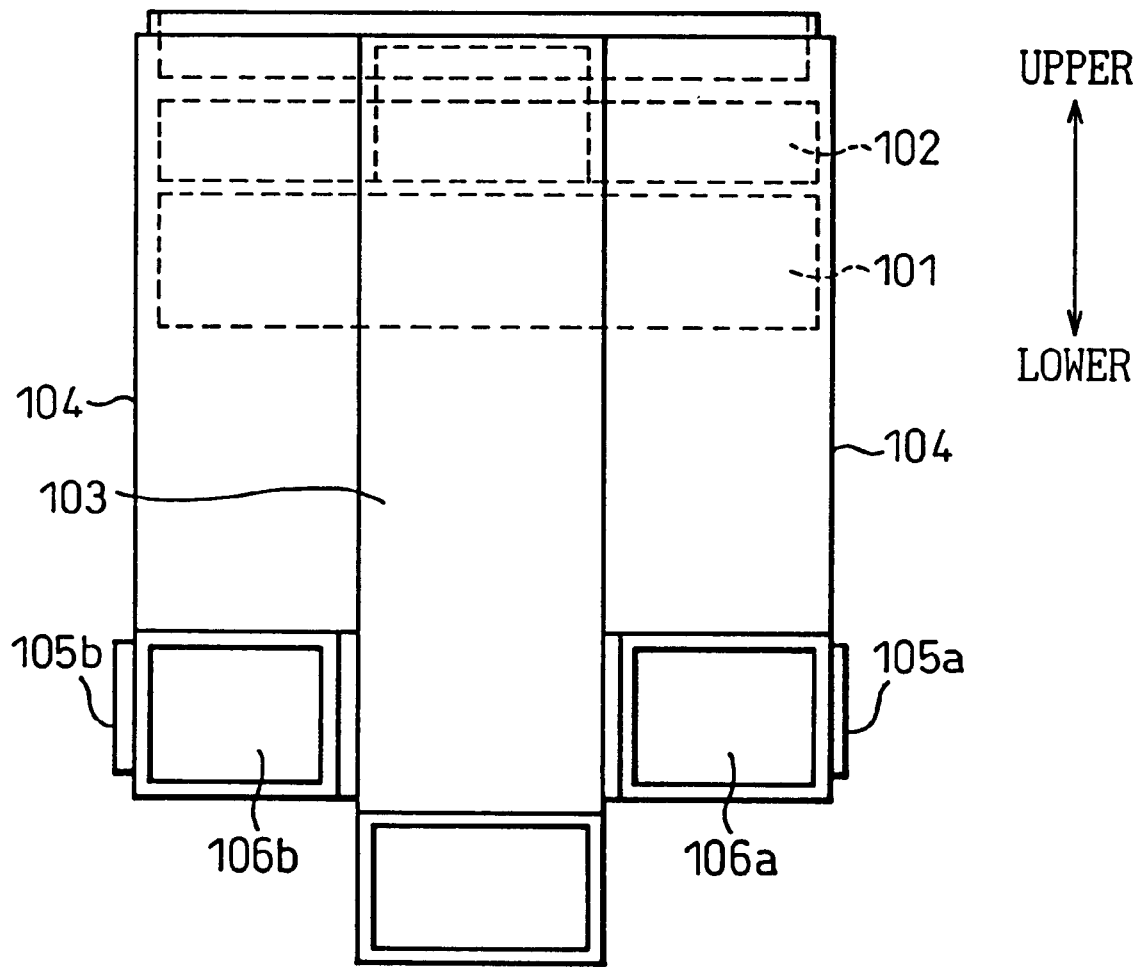
FIG. 2 is a schematic back view, seen-from the vehicle rear side to the vehicle front side, of the configuration of the foot duct and rear face duct of the related art.
Figure 3:
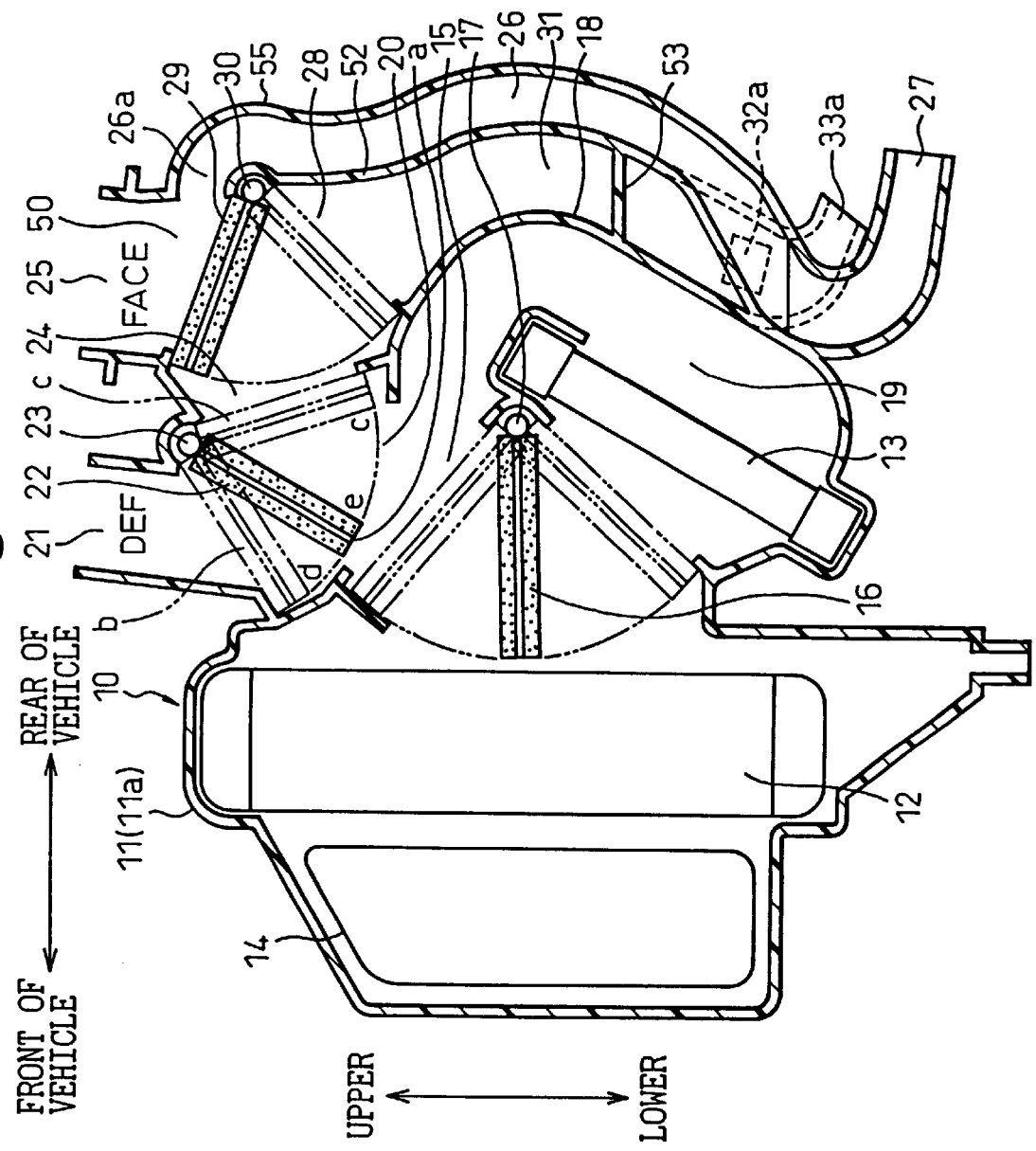
FIG. 3 is a side sectional view seen along the line III—III of FIG. 4 and shows the configuration of a vehicular air-conditioner according to an embodiment of the present invention.
Figure 4:
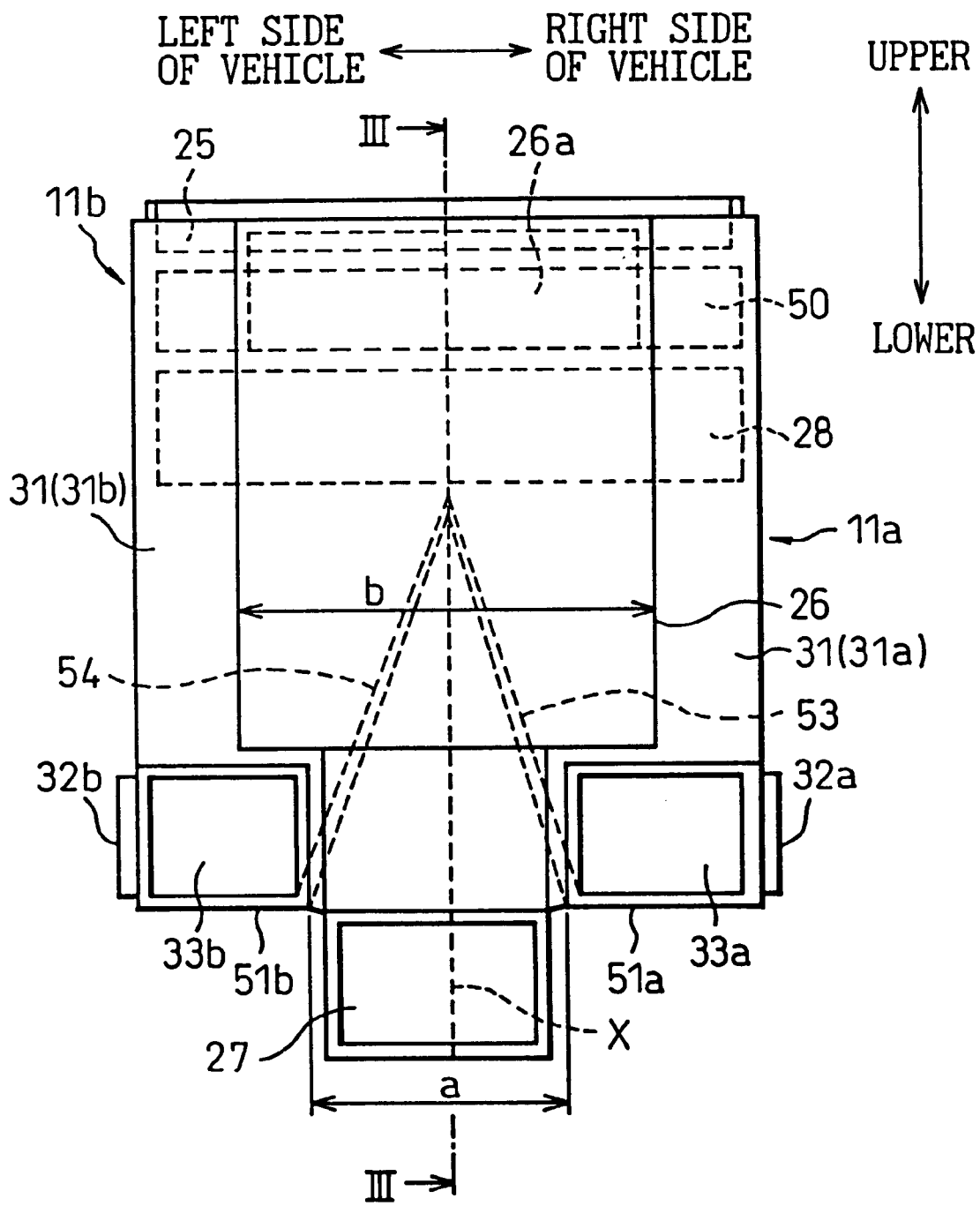
FIG. 4 is a back view, seen from the vehicle rear side to the vehicle front side, of the configuration of a vehicular air-conditioner in the embodiment.
Figure 5:
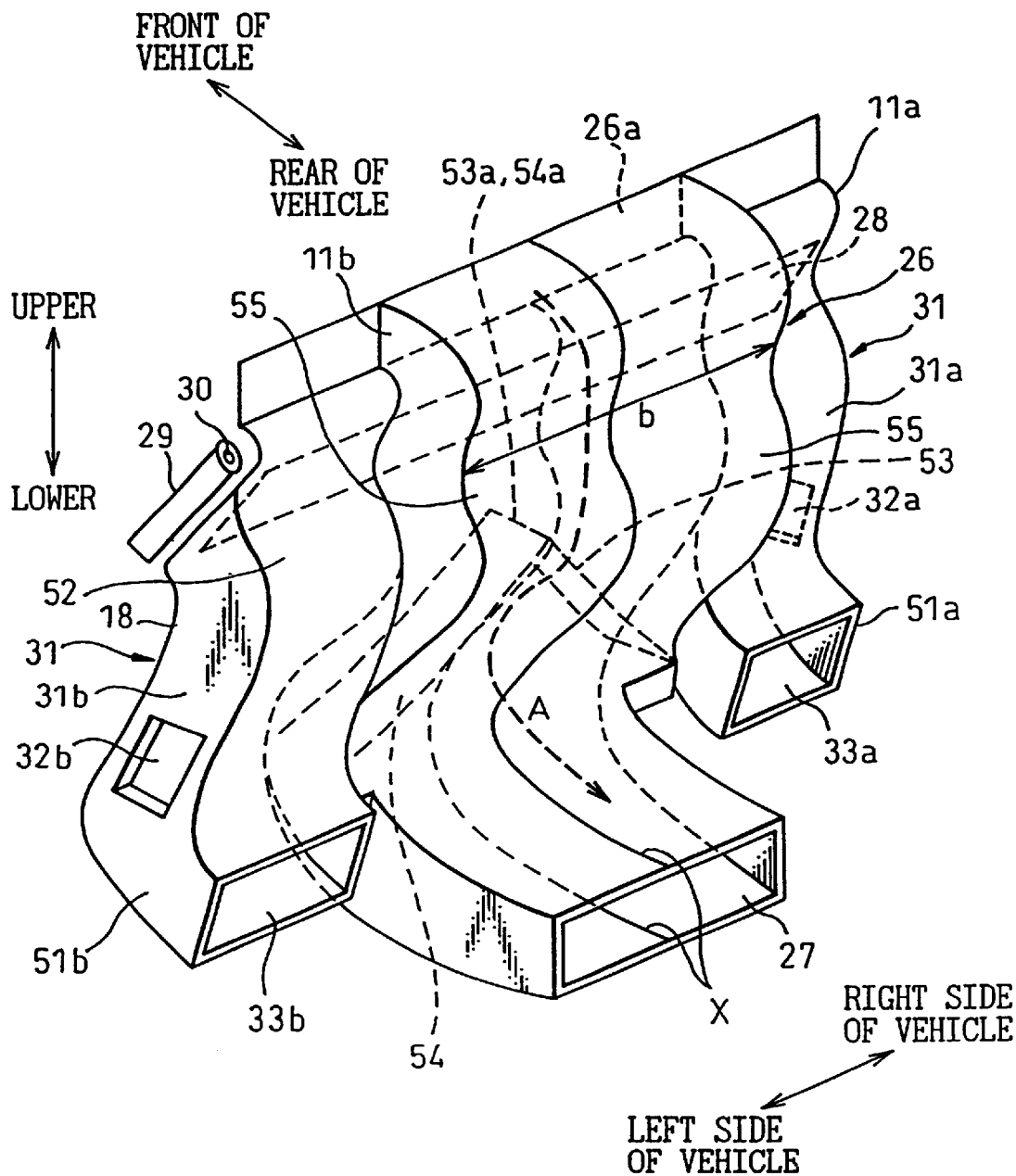
FIG. 5 is a perspective view of the detailed configuration of important parts of the above embodiment, that is, the foot duct and rear face duct.

An embodiment of the present invention will be explained next based on the attached drawings. The embodiment is an example of application to a left hand steering wheel car. FIG. 3 is a sectional view of the vehicular air-conditioner cut along the centerline of the vehicle in the lengthwise direction and shows the configuration of a vehicular air-conditioner according to the embodiment. FIG. 4 is a back view of the vehicular air-conditioner seen from the vehicle rear to front. Further, FIG. 5 is a perspective view of a duct forming the downstream portion of the vehicular air-conditioner.

The ventilation system of the vehicular air-conditioner of the present embodiment may generally be divided into two parts: a not shown blower unit and an air-conditioning unit 10 shown in FIG. 3. The blower unit is arranged offset from the center to the front seat passenger side below the instrument panel of the compartment. As opposed to this, the air-conditioning unit 10 is arranged at substantially the center portion in the widthwise direction of the vehicle below the instrument panel of the compartment.

The blower unit, as is well known, is comprised of an interior/exterior switch box for switching between introduction of interior air (air inside the compartment) and exterior air (air outside the compartment) and a blower for taking in air through the interior/exterior switch box and blowing it to the air-conditioning unit 10.

The air-conditioning unit 10 constitutes a flow path for air to the passenger compartment at the downstream side from the blower unit. In this embodiment, as shown in FIG. 3, it is of a type integrally accommodating in an air-conditioner case 11 both of an evaporator 12 of a not shown refrigeration cycle and a heater core 13 (heating use heat exchanger).

Explaining this in more detail, the air-conditioning case 11 is comprised of a shaped article of a plastic such as polypropylene having a certain degree of elasticity and superior strength. The air-conditioning case 11 is comprised of two case members 11a and 11b split and mating along the widthwise direction of the vehicle. That is, the air-conditioning case 11, as shown in FIG. 4, is comprised of the air-conditioning case 11a (right side case) positioned at the right side of the vehicle and the air-conditioning case 11b (left side case) positioned at the left side of the vehicle. Note that the hatched portion in FIG. 3 shows the actual mating faces of the two cases 11a and 11b. Further, the broken lines X in FIG. 4 and FIG. 5 show the mating faces.

The two cases 11a and 11b accommodate the heat exchangers 12 and 13, the later mentioned dampers, and other equipment, then are joined together by metal spring clips, screws, or other fastening means to constitute the air-conditioning unit 10.

The air-conditioning unit 10 is arranged at substantially the center portion below the instrument panel provided in the front position of the passenger compartment in the form shown in FIG. 3 with respect to the lengthwise, widthwise, and vertical direction of the vehicle. An air inlet 14 is formed at a position of the air-conditioning case 11a at the extreme vehicle front side. Air-conditioned air blown from the blower unit arranged at the vehicle right side from the air-conditioning unit 10 flows into the air inlet 14.

Inside the air-conditioning case 11, an evaporator 12 is arranged at a position directly after the air inlet 14. The evaporator 12 is of a type with thin dimensions in the lengthwise direction of the vehicle and is arranged in the vertical direction so as to cut across the passage in the air-conditioning case 11. Therefore, air blown from the air inlet 14 flows to the front panel of the evaporator 12 extending in the vertical direction of the vehicle. The evaporator 12, as is well known, absorbs the latent heat of evaporation of the refrigerant of the refrigeration cycle from the air-conditioned air and thereby constitutes a cooling use heat exchanger which cools the air-conditioned air passing through it.

At the downstream side (vehicle rear side) of the evaporator 12 is arranged the heater core 13 at a predetermined interval from the same. The heater core 13 is arranged inclined toward the vehicle rear side at the lower side of the air-conditioning case 11. The heater core 13 reheats the cold air passing through the evaporator 12. By passing high temperature water (engine cooling water) inside it, it constitutes a heating use heat exchanger for heating air using the hot water as a heat source.

In the air passage of the air-conditioning case 11 above the heater core 13 is formed a cold air bypass passage 15 through which air (cold air) flows bypassing the heater core 13. Further, at a position between the heater core 13 and evaporator 12 is arranged a flat air mix damper 16 which adjusts the mix of the warm air heated by the heater core 13 and the cold air passing through the cold air bypass passage 15 and bypassing the heater core 13.

Here, the air mix damper 16 is integrally connected with a shaft 17 arranged in the horizontal direction and can pivot in the vertical direction of the vehicle along with the shaft 17. The air mix damper 16 forms a temperature adjusting means for adjusting the temperature of the air blown into the passenger compartment by adjustment of the air mix.

The shaft 17 is rotatably supported by the air-conditioning case 11. One end of the shaft 17 projects to the outside of the air-conditioning case 11 and is connected to an actuator mechanism using a servo motor or manual operation mechanism through a not shown link mechanism. The pivoting position of the air mix damper 16 is designed to be adjusted by the actuator mechanism or manual operation mechanism.

In the air-conditioning case 11 at the downstream side of the heater core 13 (position at vehicle rear side), a wall portion 18 extending in the vertical direction a predetermined interval away from the heater core 13 is formed integrally with the air-conditioning case 11. A warm air passage 19 extending upward from directly after the heater core 13 is formed by the wall surface 18.

The downstream side (upward side) of the warm air passage 19 merges with the cold air bypass passage 15 above the heater core 13 and forms an air mix portion 20 which mixes the cold air and warm air.

At the upper surface (upper position) of the air-conditioning case 11 at a position at the vehicle front side is opened a defroster opening portion 21 near the cold air bypass passage 15 and air mix portion 20. This defroster opening portion 21 receives cold air from the cold air bypass passage 15 and the air-conditioned air controlled in temperature from the air mix portion 20. It is connected through a not shown defroster duct to a defroster outlet. The air is blown out from the defroster outlet toward the inside surface of the window glass at the front of the vehicle.

The defroster opening portion 21 is opened and closed by the flat defroster damper 22. The defroster damper 22 pivots about a shaft 23 arranged in the horizontal direction near the top surface of the air-conditioning case 11. By arranging the shaft 23 at the downstream position of the flow of cold air heading from the cold air bypass passage 15 to the air mix portion 20 at the peripheral edge of the defroster opening portion 21, the front end of the defroster damper 22 faces the upstream side of the flow of cold air.

When the defroster damper 22 is operated and is at the two-dot chain line position c, the defroster opening portion 21 opens fully and the connection port 24 is closed. The connection port 24 forms the passage for the flow of the air from the air mix portion 20 to the later mentioned front face opening portion 25 (front face inlet as referred to in the present invention) and/or foot duct 31 side.

At the upper surface of the air-conditioning case 11 at a position of the vehicle rear side (toward the passenger) from the defroster opening portion 21 is provided a face air inlet (face inlet) 50 communicating with an upper position of the air-conditioning unit 11. This face air inlet 50 is the opening for blowing air-conditioned air toward the upper torsos of the front seat passengers and rear seat passengers.

At the upper position of the face air inlet 50 at the downstream side and to the vehicle rear side (toward the passenger) from the defroster opening portion 21 is formed the front face opening portion 25 for blowing air-conditioned air toward the upper torsos of the front seat passengers.

The front face opening portion 25 is connected to the face outlet arranged above the instrument panel through a not shown face duct and blows air-conditioned air from the outlet toward the upper torsos of the front seat passengers in the compartment.

Further, at an upper position of the air-conditioning unit 10 to the vehicle rear side from the front face opening portion 25 and to the downstream side of the face air inlet 50 is formed a rear face opening portion 26a (rear inlet). The rear face opening portion 26a is the air inlet of the rear face duct 26. The rear face duct 26 extends toward the bottom and is for leading air-conditioned air toward the upper torsos of the rear seat passengers. The rear face duct 26 is formed by assembling the air-conditioning cases 11a and 11b as will be understood from FIG. 5.

Further, a duct (not shown) is connected to the open end 27 formed at the lower part of the rear face duct 26. Air is blown from the rear face outlet provided at the front end of the duct toward the heads of the rear seat passengers. Note that the rear face duct 26 is arranged to extend to the vehicle rear between the driver's seat and the front passenger seat. The rear face outlet is arranged at the vehicle rear side of a console box for holding small objects arranged between the driver's seat and the front passenger seat.

Next, at an upper portion of the air-conditioning unit 10, a foot air inlet 28 (foot inlet) opens at a position to the vehicle rear from the connection port 24. The foot air inlet 28 is arranged to be aligned in the vertical direction with the face air inlet 26a. The foot air inlet 28 is for blowing air-conditioned air toward the lower torsos of the passengers.

Further, the foot air inlet 28 is provided positioned below the face air inlet 50 and facing the front face opening portion 25. The face air inlet 50 and foot air inlet 28 are switched to open and close by a flat foot/face switching damper 29 arranged to be pivotable about the shaft 30. That is, when the foot/face switching damper 29 is at the solid line position in FIG. 3 and the face air inlet 50 is shut, the air-conditioned air is blown to the foot air inlet 28.

The foot air inlet 28 has the above wall portion 18 as the duct wall and forms an air inlet of the foot duct 31 positioned to the vehicle rear of the wall portion 18. The flow path of the foot duct 31 extends downward following the shape of the rear face duct 26 as shown in FIG. 3. The foot duct 31 is for leading the air-conditioned air introduced to the foot air inlet 28 toward the lower torsos of the passengers.

At the vehicle rear side of the foot duct 31 is formed the above rear face duct 26. Note that the above rear face duct 26, as shown in FIG. 3, has the wall portion 52 of the vehicle rear side of the foot duct 31 as the duct wall of the vehicle front side and has the wall portion 55 of the extreme vehicle rear side of the air-conditioning unit 10 as the duct wall of the rear side. Therefore, in this embodiment, the foot duct 31 and rear face duct 26 are comprised partitioned by the wall portion 52.

Here, the foot duct 31, as shown in FIG. 4 and FIG. 5, has a right side duct portion 31a and left side duct portion 31b through which the air flowing from the foot air inlet 28 flows split to the left and right directions of the vehicle. The right side duct portion 31a is arranged at the vehicle right side of the air-conditioning unit 10 and blows air-conditioned air toward the lower torsos of the front seat right side passenger and rear seat right side passenger.

On the other hand, the left side duct portion 31b, as shown in FIG. 4 and FIG. 5, is arranged at the vehicle left side of the air-conditioning unit 10 and blows air-conditioned air toward the lower torsos of the front seat left side passenger and the rear seat left side passenger.

The right side duct portion 31a and the left side duct portion 31b are comprised as follows. As shown in FIG. 5, the foot duct 31 (31a and 31b) and the rear face duct 26 are formed by assembling the two air-conditioning cases 11a and 11b together. That is, the two air-conditioning cases 11a and 11b have integrally formed with them duct components of shapes formed by splitting the duct. By assembling these duct components, the foot duct 31 (31a and 31b) and rear face duct 26 are first formed.

The air-conditioning case 11a, as shown in FIG. 5, has integrally formed with it a first partition 53 which has a position a predetermined amount away from the lower end of the foot air inlet 28 as its upper end 53a and spans the wall portion 18 and wall portion 52. The first partition 53 is a plate-shaped member inclined, while bent downward, from the vehicle left side to the vehicle right side as will be clear from FIG. 5.

On the other hand, the air-conditioning case 11b, as shown in FIG. 5, has integrally formed with it a second partition 54 which has a position a predetermined amount away from the lower end of the foot air inlet 28 as its upper end 54a and spans the wall portion 18 and wall portion 52. The second partition 54 is a plate-shaped member inclined, while bent downward, from the vehicle right side to the vehicle left side as will be clear from FIG. 5.

As shown in FIG. 4 and FIG. 5, in the state with the two air-conditioning cases 11a and 11b assembled together, by aligning the upper ends of the first partition 53 and the second partition 54, the foot duct 31 is formed by the right side duct portion 31a and left side duct portion 31b obtained by splitting the foot duct 31 to the right and left.

At an intermediate position of the right side duct portion 31a is opened a front seat right side foot opening portion 32a opening toward the vehicle right side. The front seat right side foot opening portion 32a forms an outlet in the passenger compartment. Air introduced into the opening portion 32a is blown toward the lower torso of the front seat right side passenger.

The right side duct portion 31a is bent to extend to the vehicle rear side and form a first duct portion 51a at the downstream side from the front seat right side foot opening portion 32a. The opening portion of the end of the first duct portion 51a forms the rear seat right side foot opening portion 33a. Further, the rear seat right side foot opening portion 33a has a not shown foot duct connected to it. Air led to the opening portion 33a is blown through the foot duct to the lower torso of the rear seat right side passenger.

On the other hand, at an intermediate portion of the left side duct portion 31b is opened the front seat right side foot opening portion 32b opening toward the vehicle left side. The front seat left side foot opening portion 32b forms an outlet in the passenger compartment. Air introduced to the opening portion 32b is blown toward the lower torso of the front seat left side passenger.

The left side duct portion 31b is bent to extend to the vehicle rear side to form a second duct portion 51b at the downstream side from the front seat left side foot opening portion 32b. The opening portion of the end of the second duct portion 51b forms the rear seat left side foot opening portion 33b. Further, the rear seat left side foot opening portion 33b has connected to it a not shown foot duct. Air introduced to the opening portion 33a is blown to the lower torso of the rear seat left side passenger through the foot duct.

Further, the first duct portion 51a and second duct portion 51b are arranged substantially in parallel a predetermined interval a apart in the widthwise direction of the vehicle as shown in FIG. 4.

Next, a detailed explanation will be given of the configuration of the rear face duct 26. The duct wall surface of the vehicle front side of the rear face duct 26 is a wall portion 52 forming the duct wall surface of the foot duct 31 as explained above. The duct wall surface of the vehicle rear side forms the wall portion 55 of the extreme vehicle rear side of the air-conditioning unit 10. The rear face duct 26, however, is not formed using all of the wall portions 52 and 55 from the upstream to downstream side.

Figure 6:
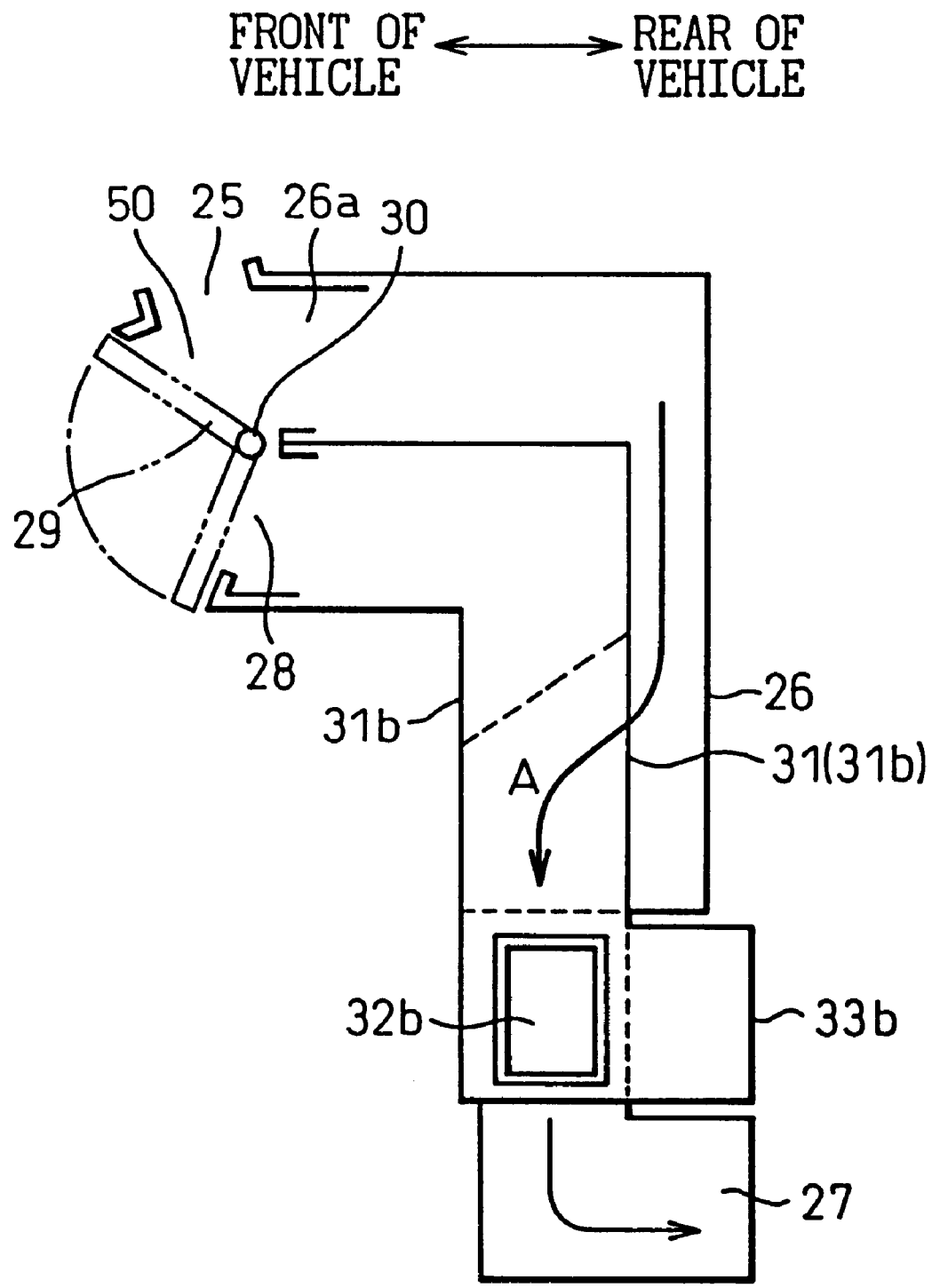
FIG. 6 is a side view, seen from the vehicle left side to the vehicle right side schematically showing important parts of the present invention.
Figure 7:
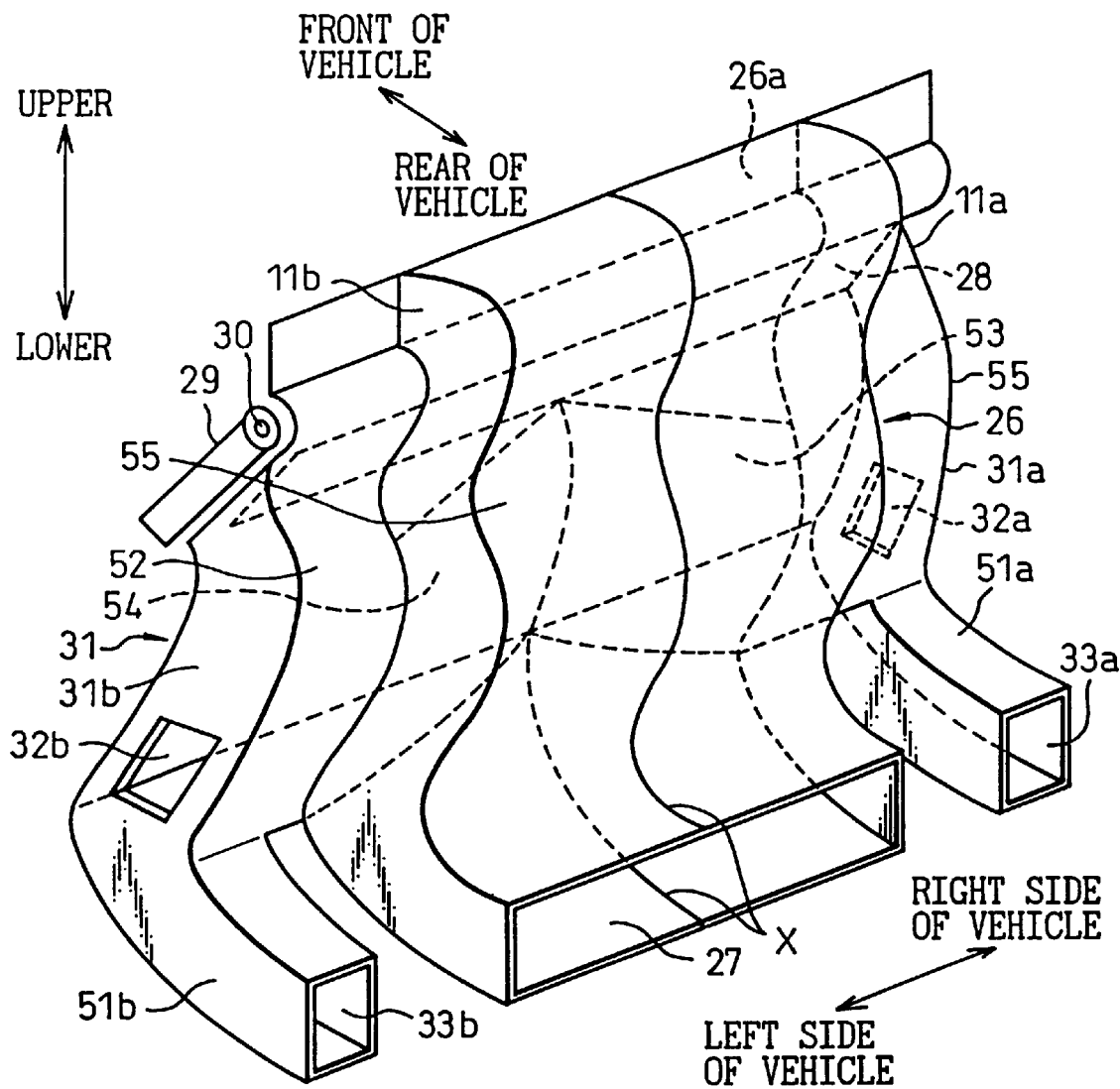
FIG. 7 is a perspective view of the detailed configuration of important parts of another embodiment of the present invention.
Figure 8A:
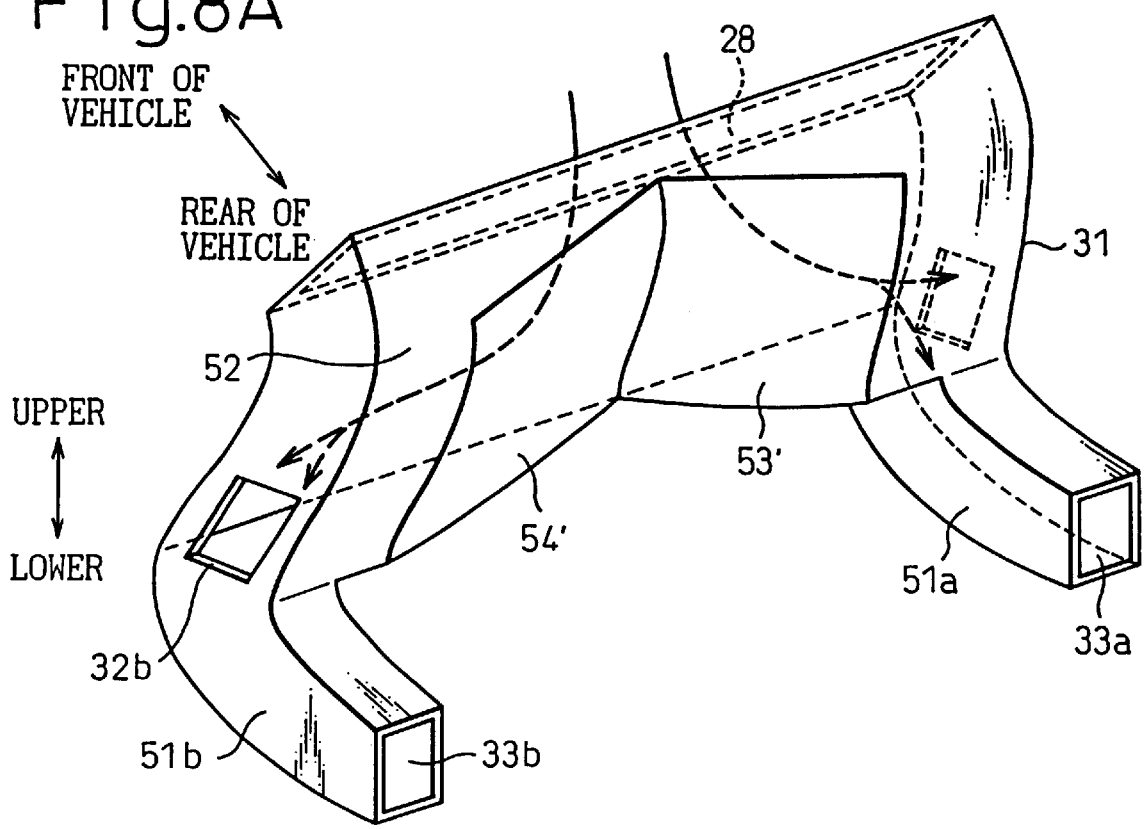
Figure 8B:
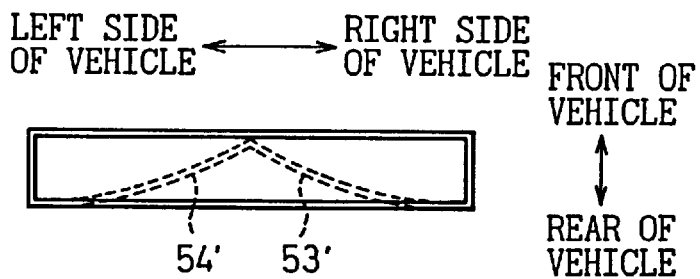
Figure 8C:
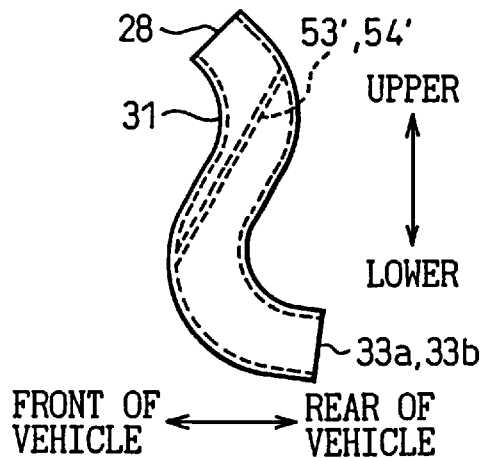

That is, as shown in FIG. 3, the wall portion 52 forming the partition between the rear face duct 26 and the foot duct 31 approaches and merges with the wall portion 18 at the lower position of the first partition 53 and the second partition 54, so the wall portion 52 is not formed as a partition at the above position. Therefore, at that position, the duct wall surface 52 of the vehicle front side of the rear face duct 26 is the same as the wall portion 18. Accordingly, the air flowing through the rear face duct 26 flows between the wall portion 55 and the wall portion 52 at an upper position of the first and second partitions 53 and 54. Next, as shown by the arrow A in FIG. 5 and FIG. 6, the rear face duct 26 is bent to the vehicle front while extending downward at a lower position of the first and second partitions 53 and 54. That is, in this embodiment, the rear face duct 26 and the foot duct 31, as shown in FIG. 3 and FIG. 6, are arranged so that the parts extending downward as shown in FIG. 3 and FIG. 6 overlap in the lengthwise direction of the vehicle. At this portion, the rear face duct 26 is arranged between the right side duct portion 31a and left side duct portion 31b.

Further, as shown in FIG. 4 to FIG. 6, at the upper position of the first duct portion 51a and second duct portion 51b, the width, in the widthwise direction of the vehicle, of the flow path positioned at the vehicle rear side from the right side duct portion 31a and left side duct portion 31b in the rear face duct 26 (width shown by b in FIG. 4 and FIG. 5) becomes larger than even the predetermined interval a.

Next, an explanation will be given of the operation of this embodiment with the above configuration. The vehicular air-conditioner of the present embodiment can be set to the following blowing modes by selection of an operation position of the defroster damper 22 and foot/face switching damper 29 forming the damper means for switching the blowing mode.

(1) Face Blowing Mode

In the face blowing mode, the defroster damper 22 is operated to the two-dot chain position d shown in FIG. 3 to close the defroster opening portion 21 and the connection port 24. Further, the foot/face switching damper 29 is operated to the two-dot chain position shown in FIG. 3 to shut the foot air inlet 28. Due to this, the face air inlet 50 opens and the air blown from the not shown blower unit is cooled by the evaporator 12 to produce cold air. This cold air is blown to the front face opening portion 25 and the rear face duct 26 side and blown to the upper torsos of the front seat and rear seat passengers.

(2) Bilevel Blowing Mode

In the bilevel blowing mode, the defroster damper 22 is operated to the two-dot chain line d shown in FIG. 3 to close the defroster opening portion 21 and fully open the connection port 24. Further, the foot/face switching damper 29 is operated to a position between the solid line position and two-dot chain line position shown in FIG. 3 to open both the face air inlet 50 and the foot air inlet 28.

Due to this, the air blown from the blower unit is blown through the front face opening portion 25 and the rear face duct 26 toward the upper torsos of the passengers, while the air flowing into the foot duct 31 is guided to the right side duct portion 31a smoothly by the first partition 53 and is guided to the left side duct portion 31b smoothly by the second partition 54 to be split to the left and right. Due to this, the air flowing into the foot duct 31 is blown divided toward the lower torsos of the front and rear right and left side passengers.

(3) Foot Defroster Blowing Mode

In the foot defroster blowing mode, the foot/face switching damper 29 is operated to the solid line in FIG. 3 to shut the face air inlet 50 and fully open the foot air inlet 28. On the other hand, the defroster damper 22 is operated to an intermediate position e shown by the solid line in FIG. 3 to substantially fully open the connection port 24.

Due to this, the air blown from the blower unit is blown out through the defroster opening portion 21 along the inner surface of a not shown vehicle window glass. The air flowing to the foot duct 31 is split between the right side duct portion 31a and left side duct portion 31b and blown toward the lower torsos of the front and rear seat right and left passengers.

(4) Foot Blowing Mode

In the foot blowing mode, the foot/face switching damper 29 is operated to the same position as with the foot defroster blowing mode to fully open the foot air inlet 28. On the other hand, the defroster damper 22 is pivoted a certain amount in the clockwise direction from the operation position e shown in FIG. 3.

Due to this, the air blown from the blower unit is blown through the defroster opening portion 21 along the inner surface of the not shown vehicle window glass, while the air flowing into the foot duct 31 is split to the right side duct portion 31a and left side duct portion 31b and blown toward the lower torsos of the front and rear seat right and left passengers. Note that in the foot blowing mode, the ratio of the amount of air blown to the defroster opening portion 21 becomes smaller than in the foot defroster blowing mode.

(5) Defroster Blowing Mode

In the defroster blowing mode, the defroster damper 22 is operated to the two-dot chain line position c shown in FIG. 3 to close the connection port 24, so the majority of the air blown from the blower unit flows from the air mix portion 20 to the defroster opening portion 21, is blown from a not shown defroster outlet toward the vehicle front window glass, and defrosts the front window glass.

In this way, in the above embodiment, the rear face duct 26 and foot duct 31 is arranged so that parts extending downward seen from the side as shown in FIGS. 3 and 6 overlap in the lengthwise direction of the vehicle. Specifically, the right side duct portion 31a and the left side duct portion 31b are comprised by splitting the foot duct 31 into two from an intermediate position at the downward side. In the space formed by this split, that is, the dead space, is arranged the rear face duct 26 bent to the vehicle front to fit in it, so the dimensions of the air-conditioning unit 10 in the vehicle front direction can be made smaller than in the related art.

Further, in this embodiment, the area of the flow path of the foot duct is reduced from the related art by the portion of the above dead space due to the first and second partitions 53 and 54, but this portion has almost no inherent effect on the flow of the air. Further, the air flowing into the foot air inlet 28 is guided by the first and second partitions 53 and 54 and smoothly flows to the first and second duct portions 51a and 51b. Therefore, according to studies of the inventors, it was confirmed that according to this embodiment, equal or more air can be obtained compared with the vehicular air-conditioner of the related art.

Further, in this embodiment, as explained above, the right side duct portion 31a and left side duct portion 31b are formed by splitting the foot duct 31 into two from an intermediate position of the downstream side of the air, therefore a sufficient amount of air can be blown to the foot duct 31 without the need for reducing the area of the opening of the foot air inlet 28.

In this case, it may be considered to reduce the width of the rear face duct 26 in the lengthwise direction of the vehicle to reduce the dimensions of the air-conditioning unit 10 in the lengthwise direction of the vehicle, but compared with this, in this embodiment, since the width b in the widthwise direction of the vehicle is made larger than the above predetermined interval a above the first duct portion 51a and second duct portion 51b at a position not interfering with the same, there is no need to reduce the sectional area of the flow path of the rear face duct 26.

Therefore, in this embodiment, as explained above, the foot duct (right side duct portion 31a, left side duct portion 31a, first duct portion 51a, and second duct portion 51b) and rear face duct 26 can be simply formed by assembling together the two air-conditioning cases 11a and 11b.

In the embodiment shown in FIG. 3 to FIG. 6, as the first and second partitions 53 and 54, use was made of ones inclined to expand to the left and right from above to below, but in another embodiment of the present invention as shown in FIG. 7 and FIGS. 8A to 8C, these may be made flared partitions 53' and 54' which expand to the left and right from the vehicle front side to vehicle rear side.

Further, the present invention includes an arrangement of the right side duct portion 31a and left side duct portion 31b to completely overlap the rear face duct 26 when seen from the side. In short, these ducts can be arranged in any manner so long as the right side duct portion 31*a* and the left side duct portion 31*b* overlap at least part of the rear face duct 26 when seen from the side.

While the invention has been described by reference to specific embodiments chosen for purposes of illustration, it should be apparent that numerous modifications could be made thereto by those skilled in the art without departing from the basic concept and scope of the invention. The operation and effect of this embodiment are substantially identical to those of the above embodiment.

What is claimed is:

1. A vehicular air-conditioner comprising:

an air-conditioning unit (10) forming a flow path of air into a passenger compartment and arranged at a front position of the passenger compartment;

a face inlet (50) communicating with an upper position of the air-conditioning unit (10);

a rear face duct (26) communicating with the face inlet (50) and leading air-conditioned air introduced to the face inlet (50) toward the upper torsos of passengers in a rear seat;

a foot inlet (28) arranged at an upper position of the air-conditioning unit (10) so as to be aligned in the vertical direction with the face inlet (50) of the rear face duct (26); and a foot duct (31) communicating with the foot inlet (28) so as to follow the shape of the rear face duct (26), and leading air-conditioned air introduced to the foot inlet (28) toward the lower torsos of the passengers in the rear seat and passengers in a front seat; wherein:

the air-conditioned air flowing into the foot duct (31) being able to be blown split to a right side front seat passenger, a right side rear seat passenger, a left side front seat passenger, and a left side rear seat passenger;

a downward extending portion of the foot duct (31) and a downward extending portion of the rear face duct (26) being arranged to overlap in the lengthwise direction of the vehicle;

the foot duct (31) is provided with a right side duct portion (31*a*) arranged at a vehicle right side of the air-conditioning unit (10) and blowing air-conditioned air toward the lower torsos of the front seat right side passenger and rear seat right side passenger and a left side duct portion (31*b*) arranged at a vehicle left side of the air-conditioning unit (10) and blowing air-conditioned air toward the lower torsos of the front seat left side passenger and rear seat left side passenger and the rear face duct (26) is arranged between the left side duct portion (31*b*) and the right side duct portion (31*a*) so that at least part is aligned in the widthwise direction of the vehicle with respect to the right side duct portion (31*a*) and left side duct portion (31*b*);

the right side duct portion (31*a*) and the left side duct portion (31*b*) are formed by splittng the foot duct (31) into two from an intermediate position at the downstream side;

at the upstream side from the position where the foot duct (31) is split into the right side duct portion (31*a*) and left side duct portion (31*b*), the rear face duct (26) and foot duct (31) are arranged to be aligned in the lengthwise direction of the vehicle and the rear face duct (26) is positioned to the vehicle rear from the foot duct (31); and the rear face duct (26) is bent to the vehicle front at an intermediate position extending downward and is arranged between the left side duct portion (31*b*) and right side duct portion (31*a*);

a cooling heat exchanger for cooling the air is arranged inside the air-conditioning unit (10) and a heating heat exchanger for heating the air is arranged at a downstream side of the cooling heat exchanger;

the air-conditioning unit (10) integrally accommodates the cooling heat exchanger and the heating heat exchanger and is comprised of two air-conditioning cases (11*a* and 11*b*) mating along the widthwise direction of the vehicle;

the foot duct (31) and the rear face duct (26) are formed integrally with the air-conditioning cases (11*a* and 11*b*) so as to form ducts by the assembly of the two air-conditioning cases (11*a* and 11*b*);

a first partition (53) included downward from the vehicle left side to the vehicle right side, splitting the air-conditioned air from the foot inlet (28), and guiding it to flow to the vehicle right side is provided at the right side case (11*a*) positioned at the vehicle right side among the two air-conditioning cases;

a second partition (54) inclined downward from the vehicle right side to the vehicle left side, splitting the air-conditioned air from the foot inlet (28), and guiding it to flow to the vehicle left side is provided at the left side case (11*b*) positioned at the vehicle left side among the two air-conditioning cases (11*a* and 11*b*); and the left side duct portion (31*b*) and right side duct portion (31*a*) obtained by splitting the foot duct (31) into two toward the left and right are formed by aligning the top ends of the first partition (53) and second partition (54) in a state with the two air-conditioning cases (11*a* and 11*b*) assembled.

2. A vehicular air-conditioner as set forth in claim 1, wherein the first partition (53) is formed integrally with the right side case (11*a*) and the second partition (54) is formed integrally with the left side case (11*b*).

* * * * *